March 10, 1925. 1,528,893
E. P. ROTHER
STORAGE WAREHOUSE
Filed Dec. 31, 1920   3 Sheets-Sheet 1

Inventor:
Eugene Paul Rother
By [signature] his Atty

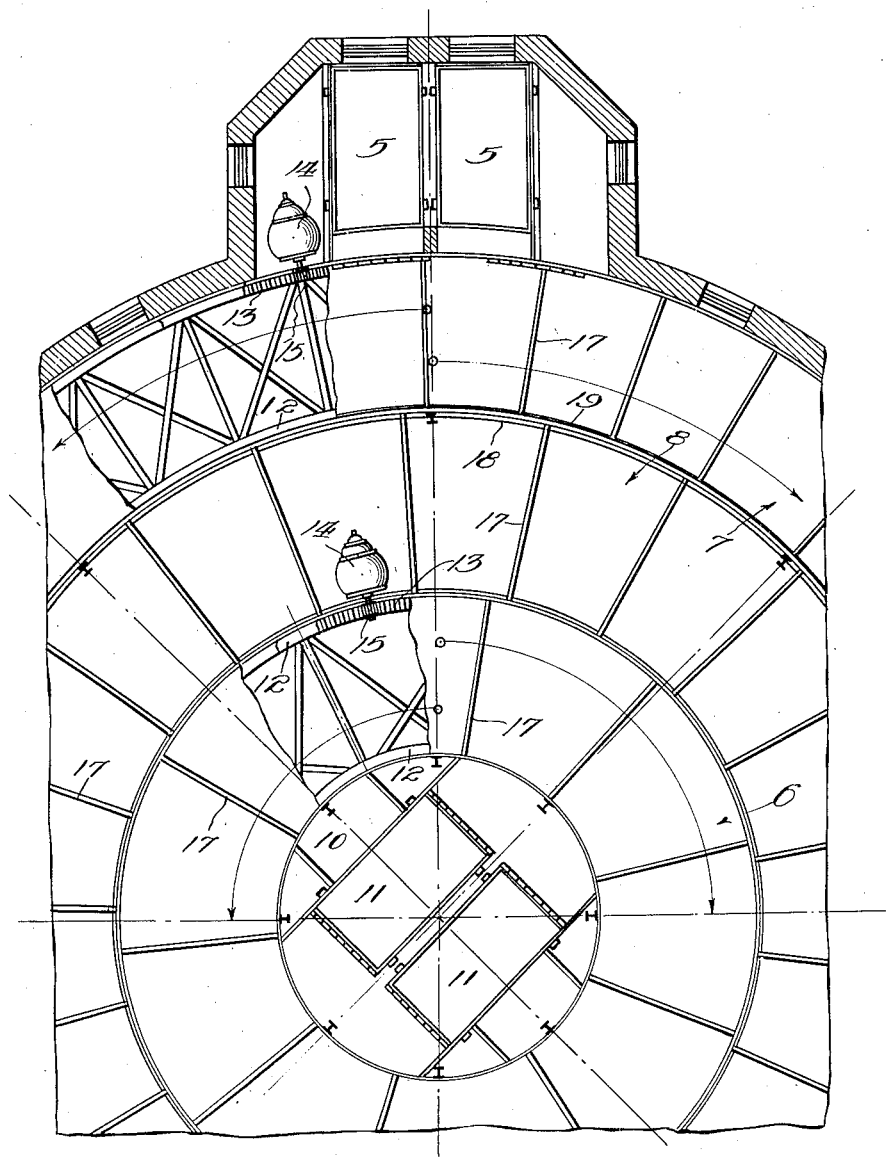

March 10, 1925. 1,528,893
E. P. ROTHER
STORAGE WAREHOUSE
Filed Dec. 31, 1920  3 Sheets-Sheet 3
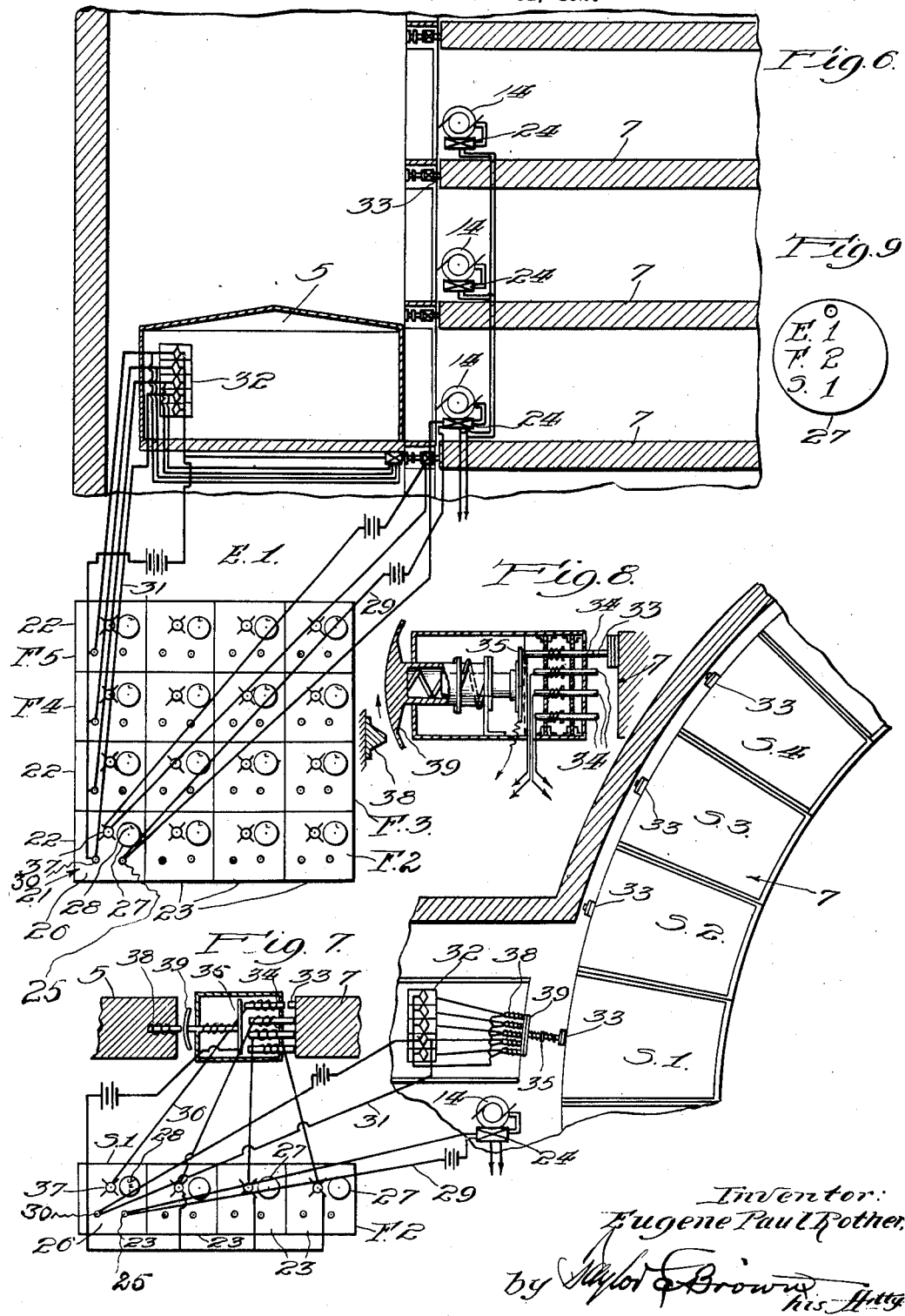

Patented Mar. 10, 1925.

UNITED STATES PATENT OFFICE.

EUGENE PAUL ROTHER, OF CHICAGO, ILLINOIS.

STORAGE WAREHOUSE.

Application filed December 31, 1920. Serial No. 434,243.

*To all whom it may concern:*

Be it known that I, EUGENE P. ROTHER, a citizen of the United States, and resident of Chicago, in the county of Cook and State of Illinois, have invented certain new and useful Improvements in a Storage Warehouse, of which the following is a specification.

My invention relates to improvements in storage warehouses and has especial reference to means for storing automobiles.

The object of my invention is to provide means whereby the articles to be stored, such as automobiles, can be quickly stored away and as quickly delivered from storage; to provide means for facilitating the placement particularly of automobiles on the storage floors without the necessity of shifting other automobiles on the floor to facilitate the placement and removal thereof; to provide means whereby the maximum percentage of the available space shall be useful for storage purposes.

A further object of my invention is to provide means and facilities whereby the maximum number of automobiles can be stored on a given area, considering the number of floors used, and yet preserve the independent placement and removal of each automobile stored. The invention also relates to the independent placement and removal of other stored articles, as well as automobiles.

My invention resides in a storage building provided with floors movable in their own planes and means for delivering automobiles or other articles upon the floors at relatively fixed points.

Expressed in another way, my invention resides in a storage building having a plurality of floors and an elevator in fixed relation thereto, the floors having parts movable past the elevator whereby automobiles or other articles for storage can be placed upon the floors and removed therefrom by moving the floors in relation to the elevator as may be necessary.

My invention also includes the feature of a rotatable floor ring of a radial width to contain an automobile and an elevator associated with the floor at an inner or outer edge thereof, which rotatable ring can serve both as a storage space and as a transfer table for transferring automobiles from the elevator to a fixed storage space either outside or inside the transfer ring.

My invention will be more readily understood by reference too the accompanying drawings forming part of this specification and in which:

Figure 4 is a fragmentary enlarged section similar to Figure 1, more particularly illustrating the construction of the building and the operation of the rotatable floor parts;

Figure 6 is a fragmentary diagrammatic vertical sectional view illustrating the combined signal system which forms part of the invention;

Figure 7 is a horizontal section showing diagrammatically the signal system;

Figure 8 is a detail fragmentary section of an electric contact device; and

Figure 9 is a plan view of one of the numbered checks which I use as part of the storage and signal system.

Figures 1, 2:
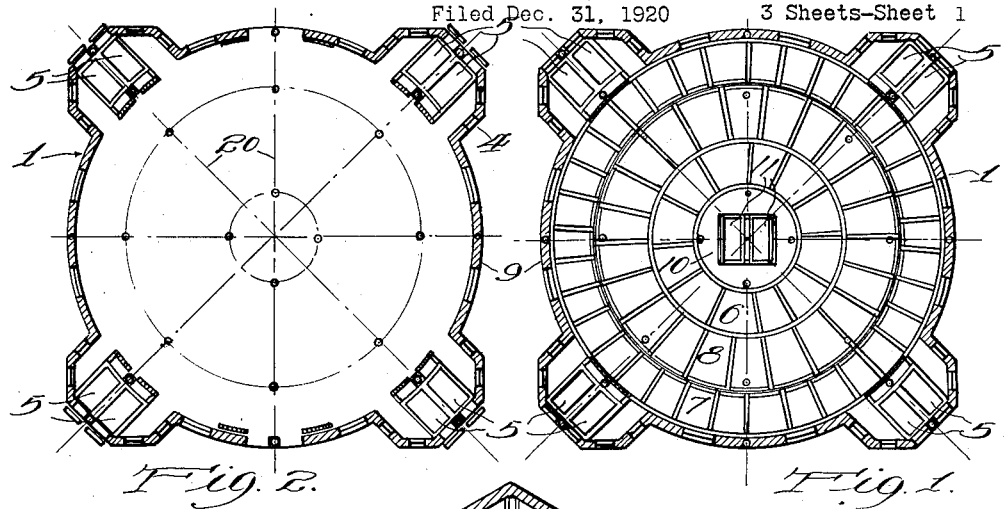
Figure 1 is a plan section of a building embodying my invention taken on the line 1—1 of Figure 3.
Figure 2 is a plan section illustrating diagrammatically the arrangement of the main girders or floor beams.
Figure 3:
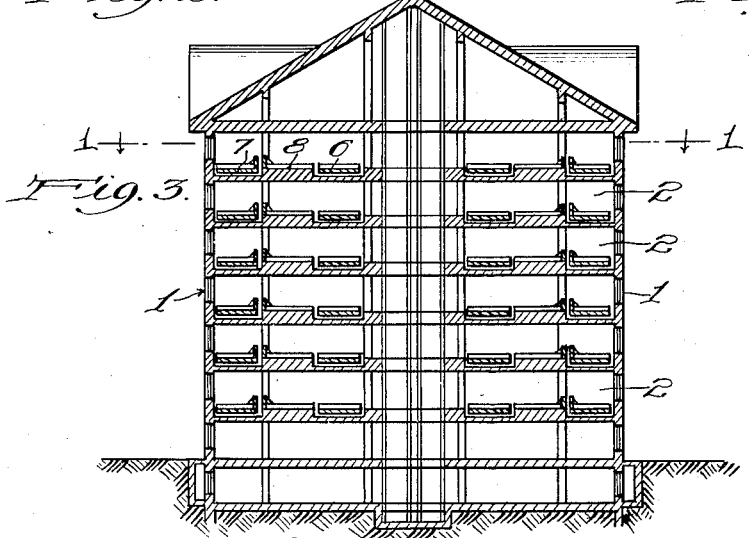
Figure 3 is a vertical substantially central section of the building illustrating the several sections of the floors in diagrammatic form.
Figure 5:
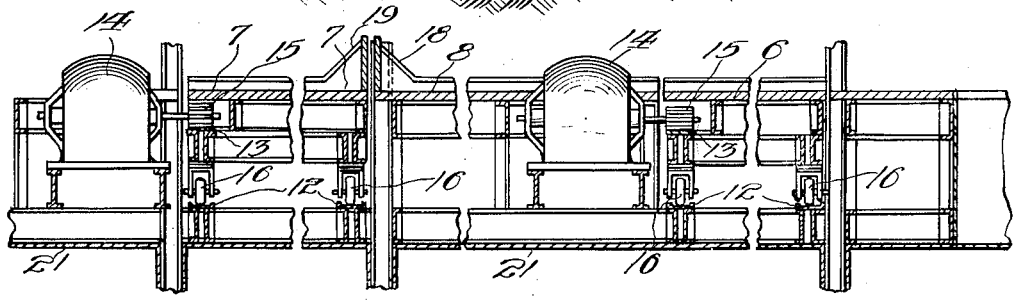
Figure 5 is a fragmentary vertical section particularly illustrating the construction and operation of the several rotatable rings or movable parts of the floors.

In said drawings 1, illustrates a building divided vertically into a plurality of storage space 2, each having a floor 3 upon which goods, such as automobiles, can be placed for storage.

The building which is shown in the drawings and which in a sense is merely typical of buildings embodying my invention, occupies a rectangular ground space, the building proper being circular in cross-section and having corner wings or extensions 4 occupying the corners of the ground space and each adapted to contain one or more elevators 5.

Each floor as shown in this particular construction consists of an inner circular section or ring 6, an outer section or ring 7 and an intermediate ring section 8.

The several sections or rings are concentric with each other and the outer wall 9, and the inner ring 6 is large enough in diameter to provide a central space 10 in which one or more elevators 11 can be arranged.

As shown in the drawings the inner ring 6 is rotatable in its plane around the center of the building as is also the outer ring or section 7 and the section 8 is stationary.

Suitable mechanism is provided for rotatably mounting and for rotating the movable sections or rings.

In the form shown this mechanism consists of suitable circular tracks 12 properly supported beneath the inner and outer edges to the rotatable floor rings 6 and 7. A suitable circular toothed rack 13 is carried by each ring and a fixed electric motor 14 is provided, one for each ring. For operatively connecting the motors to the ring I have shown a pinion 15 on the shaft of the motor meshing with the rack. This operative connection is suggestive only of a suitable means of rotating the rings by means of the motors it being obvious that in all probability a greater reduction of speed between the motor and rack would be required in practice.

Each ring is provided with a plurality of supporting wheels 16 adapted to follow the tracks 12 and whereby the floor rings are held in their relative concentric positions as they are rotated.

It will now be obvious that if an automobile is delivered to the floor from one of the inner elevators 11 it can be placed upon the inner ring 6 at any desired point by simply rotating the ring 6 around the elevator to bring the desired position opposite to the elevator door. In a similar manner an automobile or other article can be delivered upon any desired part of the outer ring 7 from any of the elevators 5. As there are four groups of outside elevators shown it is obvious that the outer ring can be readily divided into four parts, each part adapted to be served by one of the outer groups of elevators and that it will never be necessary to rotate the outer rings through more than a quarter of a complete rotation in order to place or remove articles upon or take them from each individual part of the ring. Likewise as there are two elevators within the inner rings 6, these rings can be served by rotating them only through half a revolution.

Preferably each ring is divided into stalls or sections by means of radial division members 17, see Figure 4, though obviously such divisions need not be used.

The building shown in the drawings is particularly designed for the storage of automobiles, though obviously it could be used for other goods, and each of the rings 6, 7 and 8 are radially wide enough to contain the longest automobile to be stored thereon. As shown in the drawings, the intermediate ring is adapted to be filled from the inner side by means of the center rotatable ring 6. For instance, it will be understood that an automobile can readily be delivered upon one of the center rings 6 and then by rotating this ring the automobile can be delivered on the intermediate ring 8. It will be obvious that another stationary ring or section within the outer rotating ring could be served in a like manner from the outer ring or that storage spaces outside of the outer ring could as readily be filled therefrom.

In any event it will be understood that the rotatable ring which is thus to be used as a turntable for storage or delivery of cars would have one or more spaces which would be left vacant and used only for this transfer operation.

In the arrangement shown the intermediate ring 8 is preferably provided with an abutment 18 at its outer edge to prevent automobiles from moving outwardly upon the outer ring 7 and likewise the outer ring 7 is provided with a similar abutment 19 at its inner edge to prevent the automobiles from moving inwardly upon the intermediate ring.

In Figure 2 radial girders 20 are indicated by dotted lines which extend from the circular well hole 10 to the outer wall of the building and it is obvious that such girders could be arranged to cheaply produce a skeleton structure strong enough to withstand any reasonable wind pressure.

It will be obvious, of course, that suitable fireproofing ceilings 21 can be arranged below the several floors and supported by the girders 20 to cut off the several floor spaces from each other except as they may be connected by means of the several elevator wells.

It will now be clear that each and every storage space in the building can be filled or emptied without the necessity of disturbing any article stored in any other space, that the spaces of the rotatable rings can be quickly brought to the door of an elevator, and that articles can be quickly and easily transferred into and out of the storage spaces of the intermediate ring or rings without disturbing the articles stored in any of the other spaces in the building.

The circular shape of the building results in the maximum of available storage space with a minimum quantity of materials and lends itself to the easy, cheap and quick construction of a warehouse.

The independent operation of the several floor rings, particularly by means of independent motors for each ring, permits the ready automatic control of the several rings from a central station so that a particular ring can be rotated to place any selected portion thereof in opposition to the door of any particular elevator while the elevator is going up to the floor. As an alternate arrangement it will be readily understood that the elevators could as readily be automatically controlled as well as the floor rings and thus do away with the necessity of elevator operators or with transfer men on the several floors as may be best.

Such a control and signal system is illustrated in Figures 6 to 9 inclusive in which 21' illustrates a switchboard, one of which is provided for each elevator in the storage warehouse, and in the drawings the switchboard is illustrated as connected to one of the outer elevators 5.

Each switchboard has as many horizontal panels 22 as there are storage floors which the elevator serves and in each panel 22 there are as many sections 23 as there are sections or storage spaces on the storage floor ring which the particular elevator serves.

As explained hereinbefore each floor ring has its own electric motor 14 for rotating it and in the control system I preferably provide each motor with a controller 24 which is similar to the electric elevator controllers now in common use, whereby the ring motor can be started to rotate the ring in the proper direction and to stop the ring at a predetermined point by merely pushing a button similar to the one by which an automatic elevator is started and stopped; to move it up or down from one floor to another. I provide a push button 25 in each section of each panel of the switch member which is individual to the particular section of the floor ring to which the panel relates.

For instance, section 26 is in the panel of the second floor and in the switchboard for elevator number 1 and controls section number 1 of the floor ring served by this particular elevator. This is all designated on the check 27 for use with this particular section as "Elevator No. 1," "Floor No. 2," and "Section No. 1." Each section on the switchboard is provided with a hook 28 on which to hang the check 27 relating to that section. The button 25 is in a circuit 29 connected with a controller 24 which starts the motor 14 for turning the particular ring desired.

Combined with the automatic operation of the floor ring is a signal system for informing the elevator operator which floor he is to go to and also a signal for informing the switchboard operator that the proper section of the proper floor ring has been placed in position before the elevator door so that the switchboard operator may be assured that the elevator operator is removing the desired car or is placing a car in the selected section.

This signal system consists of a switch or button 30 on the board, one in each section which is connected in a circuit 31, connected with an annunciator 32 in the elevator and which is adapted to show a light or other indication to the elevator operator to tell him which floor he is to stop at.

For the purpose of showing to the switchboard operator that the elevator has stopped at the right floor and that the right section of the floor ring has been placed in front of the elevator door I provide selective contact projections 33, one on each section of the floor ring 7 and a series of spring-pressed plungers or circuit closers 34 which are arranged at different levels as are also the several projections 33 so that each projection 33 operates its own circuit closer.

Each circuit closer 34 is in circuit with its own switch 30, as shown in Figure 7. As each projection 33 contacts with the plunger 34 it forces the plunger toward a movable contact plate 35, but in fact not into contact with the same. For effecting the final contact to close the signal circuit 36 in which the signal lamp 37 on the section of the switchboard is connected, the contact plate 35 is moved outwardly or toward the plunger 34 by the elevator as it rises into position in relation to the floor. The elevator carries a magnetic contact plunger 38 which is arranged in the annunciation circuit. This plunger 38 projects so as to contact with a shoe 39 associated with the contact plate 35 and adapted as the elevator reaches the designated floor to push the plate 35 into contact with the plunger 34 and complete the circuit 36 to cause the lamp 37 to give the signal.

The shoe 39 and contact plate 35 are spring mounted and provided with suitable movement limiting means so that the circuit is normally open and requires the placement of the proper section of the floor ring in position before the door of the designated elevator to close the signal circuit.

When the check 27 is in place on the section of the switchboard the section of the floor ring is supposed to be vacant and when an automobile is sent to any particular section of a particular floor ring the check is supposed to be in the possession of the owner of the car to be returned when he wants his car delivered to him.

It will be understood that the several shoes 39 for the several floors on an elevator as the magnetic plungers 38 carried by the elevator are arranged out of alignment so that they will not interfere with each other.

As it is obvious that many modifications of my invention will readily suggest themselves to one skilled in the art, I do not limit or confine my invention to the specific details of construction and operation as shown and described.

I make no claims herein to the annunciator signal system illustrated and described, as the subject matter thereof is set forth in a copending divisional application, Serial No. 647,240 filed by me June 23rd, 1923.

I claim:

1. In a storage building, an elevator, a rotatable floor ring associated with the elevator and adapted to be rotated to bring any specified portion of the floor directly opposite to the elevator door for the direct transfer of articles to and from the floor.

2. In a storage warehouse, a plurality of storage floors one above the other, each floor having a rotatable floor ring for the reception of goods, an elevator for delivering goods upon the floors at relatively fixed points, and means for rotating the several rings to bring any specified portion into delivery relation to the elevator.

3. In a storage warehouse, a storage floor, a stationary ring-like storage space, a rotatable storage floor ring at one side of the stationary ring, an elevator associated with the rotatable ring for delivering goods thereto at a relatively fixed point, the rotatable ring being adapted to serve as a transfer table to deliver goods to any specified portion of the stationary storage space.

4. A circular storage building having circular storage floors divided into a plurality of storage ring spaces, some of which are rotatable, elevators associated with the rotatable rings for delivering goods at relatively fixed points thereto, the rings being capable of serving as transfer tables to place goods on the stationary part of the floor at specified points without the disturbance of goods stored on such storage places.

5. A circular storage warehouse having a plurality of storage floors, the outer portion of each floor being in the form of a rotatable ring, and a plurality of elevators for delivering goods to the ring at specified points.

6. In a storage warehouse, a plurality of storage floors, each thereof having an outer rotatable storage floor ring and an inner rotatable storage floor ring, a stationary storage floor between the two rings, an elevator within the inner ring and an elevator outside of the outer ring for delivering goods to said rings at specified points, the rings being rotatable in reference to the delivery elevator for bringing any specified portion thereof in position to receive goods directly from the elevator.

Signed at Chicago, Illinois, this 29th day of December, 1920.

EUGENE PAUL ROTHER.